United States Patent [19]

Clatfelter

[11] 4,342,788

[45] Aug. 3, 1982

[54] METHOD OF COOKING CHICKEN PARTS

[75] Inventor: Kenneth A. Clatfelter, Farmington, Ark.

[73] Assignee: Campbell Soup Company, Camden, N.J.

[21] Appl. No.: 206,900

[22] Filed: Nov. 14, 1980

Related U.S. Application Data

[63] Continuation-in-part of Ser. No. 44,465, Jun. 1, 1979, abandoned.

[51] Int. Cl.³ .............................................. A23L 1/315
[52] U.S. Cl. ............................ 426/243; 219/10.55 M; 426/438
[58] Field of Search ........ 426/243, 241, 242, 438–441, 426/296, 293, 302, 305; 219/10.55 E, 10.55 R, 10.55 M; 99/451, 403, 404

[56] References Cited

U.S. PATENT DOCUMENTS

| | | | |
|---|---|---|---|
| 3,230,864 | 1/1966 | Krajewski | 426/243 |
| 3,256,101 | 6/1966 | Arns | 426/241 |
| 3,365,301 | 1/1968 | Lipoma et al. | 426/242 |
| 3,398,251 | 8/1968 | Jeppson et al. | 426/241 |
| 3,597,228 | 8/1971 | Jeppson et al. | 426/243 |
| 3,646,878 | 3/1972 | Keller | 426/243 |
| 3,679,432 | 7/1972 | Schiffman | 426/243 |
| 3,906,115 | 9/1975 | Jeppson | 426/243 |
| 4,054,673 | 10/1977 | Kaufman | 426/438 |
| 4,154,861 | 5/1979 | Smith | 426/243 |

FOREIGN PATENT DOCUMENTS

| | | | |
|---|---|---|---|
| 919489 | 1/1973 | Canada | 426/242 |
| 416060 | 7/1974 | U.S.S.R. | 426/243 |

OTHER PUBLICATIONS

Food Engineering, 8/64, p. 95.
Food engineering, 7/65, pp. 54, 55.

*Primary Examiner*—Steven L. Weinstein
*Attorney, Agent, or Firm*—Albert L. Free

[57] ABSTRACT

Fresh chicken parts are fried by cooking battered chicken parts in hot cooking oil at a temperature of 340°–400° F. for a period of time, such as 3 to 8 minutes, sufficient to dehydrate and brown the batter but insufficient to cook completely the interior meat, after which the parts, immersed in hot oil, are subjected to high intensity microwave energy of 10 to 25 kilowatts for a short period of time, less than one minute, to complete the cooking of the interior meat to a temperature of at least 160° F. at the bone.

5 Claims, No Drawings

METHOD OF COOKING CHICKEN PARTS

REFERENCE TO RELATED APPLICATION

This application is a continuation-in-part of U.S. application Ser. No. 044,465 of Kenneth A. Clatfelter, filed June 1, 1979 and entitled Process for Frying Chicken Parts, now abandoned.

BACKGROUND OF THE INVENTION

Fried battered chicken parts have long been prepared by home and restaurant chefs, and have been a favorite of many consumers. It has therefore been attractive for mass producers of food products to attempt to manufacture an equivalent product which can be frozen, packaged, distributed and sold to customers for their subsequent thawing and warming prior to consumption.

One typical way of preparing such food on a mass production basis has been to fry the battered chicken parts in hot cooking oil for a time sufficient to cook them thoroughly while also browning and crisping their exteriors. Although such product has been found acceptable, this process of cooking does involve the following drawbacks. First, it requires a considerable time for the exteriorly-applied frying heat to penetrate the battered chicken part and cook the interior meat thoroughly, especially the meat immediately adjacent the bone. Secondly, the cooking of the battered exterior of the chicken part is, in such process, necessarily strongly tied to the cooking of the interior meat, since the same external heating source is used simultaneously to cook the exterior battered portion and the interior of the meat. Thus, thorough browning and cooking of the exterior battered portion of a thin chicken part may result in more cooking of the interior than is desirable, with some undesirable drying or toughening of the interior meat, while if a thick chicken part is cooked sufficiently to assure complete cooking of the most interior part of the meat this may tend to result in overcooking or overbrowning of the exterior portion; conversely, if a thick battered chicken part is cooked just enough to produce optimal browning and crisping of the exterior, the interior meat portions adjacent the bone will generally not be adequately cooked, or if a thin battered chicken part is cooked only sufficiently to cook the interior to proper moist doneness, the exterior may not have the crispness, taste or coloration desired.

U.S. Pat. No. 3,597,228 of Morris R. Jeppson entitled Method of Preparing Precooked Poultry Pieces, filed June 30, 1967 and issued Aug. 3, 1971 describes several other methods which have been tried for the high-volume preparation of cooked chicken. One such technique comprises cooking chicken pieces in a steam chamber. However, this is described in the patent as having the substantial drawbacks that it requires cooking times approaching one hour, does not provide a product with the characteristics which the consumer associates with fried chicken, and tends to produce product which is unevenly cooked, with the interior portions of the thick pieces being somewhat underdone while the surface regions tend to be overdone and soggy; also, the skin has a tendency to detach from the chicken parts and at best lacks the preferred crispness and golden coloring. In addition, an undesirable phenomenon known as bone darkening tends to occur, which produces an internal coloration which is unattractive to the consumer.

Also mentioned in that patent as a possibility is cooking the chicken or other poultry by a combination of steam and microwave heating. The microwaves accomplish quite rapid cooking of the product but tend to dehydrate the product; the steam simultaneously present tends to maintain product moisture despite the drying-out due to the microwave cooking. The cited patent states that, however, chicken cooked in this manner still lacks the taste, texture and appearance, particularly in the surface regions, which the consumer associates with fried chicken.

The referenced patent also states that, at the time of filing the application from which that patent matured, known techniques did not provide for the economical high-volume production of precooked storable poultry food products having all the flavor, texture and appearance characteristics which are desired by consumers. The patentee of the referenced patent proposes to overcome various of the afore-described difficulties by a cooking process in which both microwave heating in a hot, humid atmosphere and hot oil cooking are utilized. In one variation of patentee's process, chicken parts are breaded (not battered) prior to microwave and steam heating, to produce what patentee terms a high quality product having the characteristics of conventionally fried chicken. The steam and microwave heating is used in conjunction with a "short" hot oil cooking step which "generally follows the microwave heating." The purpose of this is to produce a browning reaction which fully develops the preferred flavor and crispness as well as coloration. The microwave in steam is stated to be performed typically for from about 3 to about 6 minutes, and followed by a brief second cooking in hot oil for about 1 minute.

The referenced patent further states that it is usually preferable not to use a batter, in order to avoid producing a heavy coating on the chicken pieces; with such heavy coating, the finished product may tend to have somewhat the character of steamed chicken beneath the batter, and the preferred skin crispness may be lacking. Further, the patent states that while it is possible in some instances to perform the oil cooking step prior to the microwave cooking in steam, poor results are obtained if this is done, in that a longer frying time is required and there is a tendency for the product surface to become too moist from water driven to the surface during the subsequent microwave cooking step.

Accordingly, it is an object of the present invention to provide a new and useful method of cooking battered chicken parts.

Another object is to provide such method which is quick and economical, yet produces an excellent product, and does not require the use of steam.

A further object is to provide such method which makes possible the quick and economical cooking of battered chicken parts in a manner such that the exterior battered portions of the chicken part are provided with the optimum amount of cooking to ensure the desired crispness and color, while the interior portions are cooked to the optimum degree and with adequate moisture retained, so as to produce a high quality product.

SUMMARY OF THE INVENTION

In accordance with the invention, high quality cooked battered chicken parts are provided, quickly and economically, by first cooking the battered chicken part in hot cooking oil at a temperature of from about 340°–400° F. for a substantial period of about 3 to 8 minutes sufficient to dehydrate the battered exterior of the chicken and to brown it appropriately, and then completing the cooking of the interior portion of the chicken part by microwave cooking it while completely immersed in cooking oil for a shorter period of time, using high-intensity microwave energy to complete the cooking of the interior meat to the optimum degree. The microwave power applied to the chicken part in the cooking oil is at least about 5 kilowatts and the time of its application less than about 1.5 minutes; preferably, the applied microwave power is at least 10 kilowatts, and the time of microwave cooking about 8 to 30 seconds, applied to the chicken parts while they are passing through an oil-filled waveguide along which the microwaves are propagating. It is also preferred that the immersion oil used in the microwave cooking step be maintained hot, well above the boiling point of water and preferably in a range of about 250° to 350° F.

The period of initial cooking of the battered chicken part in hot oil is less than that required to completely cook the interior meat, but sufficient to dehydrate and brown the battered exterior portion of the chicken and partially cook the interior meat. As a result of the dehydrating, the heating effect of the later-applied microwave energy is concentrated in the interior meat, and therefore produces little additional cooking of the batter and the exterior portion of the chicken. Accordingly the microwave power and the time of its application can be selected substantially independently of the requirements for optimum cooking and browning of the exterior portion of the chicken part, and so that the optimum desired amount of cooking of the interior of the chicken and the retention of moisture therein can be obtained as desired, and in a very short time.

Thus, contrary to the teaching of the above-identified Jeppson patent, applicant has found that battered chicken parts can be cooked to provide a very high grade product by using an initial cooking in hot oil for a period sufficiently long to accomplish the desired browning, crisping and dehydration and some cooking of the interior meat, followed by a relatively short, high-powered application of microwave energy affecting primarily the interior of the meat and completing its cooking to the optimum degree without drying the interior meat, conducted according to parameters of microwave power and time substantially independent of considerations relating to the cooking of the exterior portion of the battered chicken part.

It will be understood that microwave cooking in oil is not, per se, new as a general proposition. However, its use as part of applicant's novel combination of steps to produce an unexpectedly high quality food product economically in a short time is believed to be new. Further, while applicant does not fully understand all of the detailed physical interactions which occur within the batter and meat during his process of cooking, since they are quite complex in detail, he has established by large numbers of runs and tests that battered chicken parts of different thicknesses and cuts can be quickly and economically cooked to produce a very high quality product having the characteristics desired in fried chicken by using his process, involving a relatively long initial oil cooking to brown and cook the batter and to partially cook meat below the surface, followed by a short high-powered microwave cooking in oil for a time and at a power level selected in accordance with the nature of the particular chicken part being cooked, to give an excellent result contrary to the teachings of the above-identified Jeppson patent.

DETAILED DESCRIPTION OF SPECIFIC EMBODIMENT

Without thereby in any way limiting the scope of the invention, the following description of specific embodiments of the method of the invention are provided in the interest of complete definiteness.

A chicken part such as a drumstick, thigh, wing or breast is cut from a fresh fryer chicken, rolled lightly in flour, dipped in a flour-water batter such as 35% flour and 65% water by weight, again rolled lightly in flour, and then immersed in hot cooking oil such as a vegetable oil, or a combination of vegetable oils, such as soy bean, peanut, cottonseed or corn oil. Some typical temperatures and times for the several types of chicken parts are as follows: drumsticks, 5.5 minutes at 345° F.; thighs, 6.5 minutes at 345° F.; wings, 5 minutes at 345° F.; breasts, 5.5 minutes at 345° F.

The pre-frying step described above is followed by the application of microwave energy for a short period to complete the cooking of the interior meat. This may be done by a single-stage batch process in which the pre-frying is performed in oil in a pan within the multimode microwave cavity of a microwave cooker, with the microwave power initially turned off, after which the microwave power is turned on for a short period to complete the cooking of the interior meat; or, more awkwardly, a two-stage batch process may be used in which the pre-frying is done outside the microwave cavity and the pre-fried parts then placed in the cavity in an oil-filled pan to complete the cooking with microwave energy. However, it is preferred to perform the microwave cooking by the continuous oil-immersion waveguide cooking method described in co-pending application Ser. No. 049,352 of Alec B. Smith, filed June 18, 1979 and entitled Microwave Cooking of Food Products which is now abandoned in favor of continuation-in-part application Ser. No. 208,345, filed Nov. 19, 1980, not only because it provides a continuous-type cooking process more suitable for mass production, but also because it is more efficient in achieving delivery of the high levels of the microwave power into the interior of the chicken and permits much shorter times for the completion of the cooking of the interior meat.

In the batch process, to perform the microwave cooking the pre-fried battered chicken parts are immersed in fresh hot cooking oil at a temperature of from about 340° to 350° F., in a microwave cooker. The microwave cooker preferably employs a magnetron microwave generator operating in the 915 megahertz microwave cooking frequency band. Typical microwave power levels and cooking times for the several parts itemized are as follows: drumsticks, 2.5 minutes at 10 KW; thighs, 1.5 minutes at 10 KW; wings, 1 minute at 10 KW; breasts, 1.5 minutes at 10 KW. The oil in which the chicken parts are immersed during the microwave cooking is preferably maintained at a temperature of from about 250°-350° F. to boil out of the oil any moisture which may otherwise be present in the oil, thus making it less absorptive of the microwave energy and permitting the microwave energy to reach and enter the interior of the chicken part to the maximum degree. Immediately after the microwave cooking operation, the chicken part is removed from the microwave cooker, allowed to drain, then frozen and packaged.

It will be understood that the times and temperatures used for the precooking in hot oil are sufficient to provide the desired dehydrating of the exterior battered portion of the chicken part, and in so doing will also lightly brown the exterior of the batter and raise the temperature of the meat adjacent the interior bone into the range of about 100°–150° F. Adequate cooking of the interior meat adjacent the bone is accomplished when its temperature has been raised to about 160° F. or slightly more in the case of breasts, and to about 185° F. or slightly more in the case of the other types of chicken parts. The microwave cooking of high energy and short duration is applied sufficiently to raise the temperature of the meat at the interior, especially adjacent the bone, to the above-mentioned desired final temperatures. Because of the dehydrating of the exterior battered portions of the chicken, the microwave energy can more readily penetrate to the interior of the meat to accomplish its cooking purpose in the specified short period of time, and without materially altering the extent of cooking of the exterior battered portions, whereby cooking of the interior and of the exterior are substantially independent of each other, as is desired to obtain optimum cooking of these two respective portions of the product.

It will be understood that, all else being equal, in the pre-frying step higher oil temperatures are used with somewhat shorter fry-times and in the microwave cooking step higher powers permit shorter final cooking times; also, the thicker the product, the larger the amount of microwave energy (microwave power multiplied by duration of application thereof) used, all else being equal.

While it is feasible to practice the process by the batch process, as mentioned above I prefer to practice the method of the invention by means of apparatus of the type disclosed in co-pending application Ser. No. 049,352 of Alec B. Smith, in which the preliminarily oil-fried chicken parts are transferred by an automatic conveyor to a partially oil-filled section of waveguide supplied with microwave energy at one end and connected at the other end to an absorptive water load for absorbing any microwave power not absorbed within the waveguide section. The chicken parts are fed sequentially into one end of the waveguide section while immersed in the cooking oil, and are carried along within the guide by a flow of the oil while cooking is completed by the microwave energy, until they reach the food discharge end of the waveguide section as described in detail in the above-identified co-pending application. In such case, the times for the microwave final cooking are much shorter than in the batch process, generally being from about 8 seconds to about 1 minute.

Without limiting the scope of the invention, the following specific examples are given illustrating the application of the invention to four different types of chicken parts, namely, drumsticks, wings, thighs and breasts, for both batch and waveguide methods.

EXAMPLE I

Each of a batch of drumsticks at about 40° F., cut from fresh fryer chickens, is manually rolled in a flour to form a thin flour dusting on the exterior of the skin. The floured drumsticks are dipped in a flour-water batter, such as 35% flour to 65% water; minor amounts of other substances such as salt, flavoring or spices may be included in the batter, which is thoroughly mixed before the dipping step. Each dipped part is then rolled in flour to form a thin flour coating on the exterior.

In the batch process, the battered and floured drumsticks are placed on a wire rack and submerged in about 6 to 10 inches of vegetable oil in a metal container positioned within the cavity of a conventional multi-mode microwave cooker, such as have been made commercially by Raytheon Corp., having the capability of generating from zero to about 25 KW of microwave power at about 915 MH, the power level produced being manually adjustable. The vegetable oil may be heated externally of the cavity to about 345° F. and pumped to and from the container by appropriate piping and with appropriate filtering devices for maintaining the oil clear of food particles. For the first 5.5 minutes the microwave power is turned off, permitting the battered drumsticks to brown and partially cook. At the end of that time, the microwave cooker is turned on to a power level of 10 KW for 2.5 minutes, then shut off and the rack of browned and fully cooked drumsticks removed. The drumsticks, after draining, exhibit a crispy brown batter and skin, and a moist, tasty interior meat fully cooked even adjacent the bone, the meat adhering well to the bone. After conventional quick freezing, packaging, frozen storage, depackaging and warming in a domestic type of hot air kitchen oven for about 30 to 35 minutes at 350° to 375° F., the drumsticks exhibit substantially the same desirable qualities as described above with regard to their condition after microwave cooking and before freezing.

The foregoing batch process has been conducted with drumsticks as described, and the temperature in the interior meat adjacent the bone measured by means of a thermocouple junction placed at this location. In this way, it has been found that in the specific form of the process described above the first cooking in hot oil raised the interior meat temperature to about 120° F., while the subsequent final microwave cooking raised this temperature further to about 185° F.

However, for mass production purposes it is preferred to use the apparatus and form of process disclosed in said co-pending application of Alec Smith, in which the transfer of the battered chicken parts from the first oil cooking step to the microwave cooking step is automated, and the partially precooked chicken parts are automatically transported in sequence into, through and out of a waveguide; the chicken-inlet end of the waveguide is supplied with microwave energy, and a flow of hot cooking oil is provided in the waveguide to fill the food-inlet end of the waveguide at the point where the microwave energy first reaches the chicken parts and to move the chicken parts along and through the waveguide to the discharge end thereof. In this form of practicing method, the temperature of the precooking oil may be 395° F., the time the drumsticks are in it 3.5 minutes, the temperature of the oil in the waveguide 350° F., the level of microwave power applied 25 KW, and the time period of microwave application during which the drumstick is subjected to microwave power in the waveguide about 23 seconds, to produce substantially the same quality of final product described above.

EXAMPLE II

Large battered chicken wings were prepared by the batch method described above in Example I, with the exception that in the batch process the precooking time was 5 minutes, while the microwave cooking was for 1 minute at a power level of 10 KW.

In the waveguide form of final microwave cooking, the pre-frying may be at about 400° F. for about 4 minutes, the temperature of the oil in the waveguide about 350° F., the power level of the applied microwave about 25 KW, and the duration of the microwave cooking about 12 seconds.

EXAMPLE III

Battered chicken thighs were prepared by the batch method as described in Example I above, with the exception that the time of microwave cooking was 1.5 minutes at a power level of 10 KW. The waveguide cooking form of the process was as in Example I, except that the pre-frying was at 400° F. for 5 minutes and the microwave power was applied for about 21 seconds at 25 KW.

EXAMPLE IV

Battered chicken breasts were prepared and cooked by the batch method as described in Example I with the exception that the temperatures and times for pre-cooking were 345° F. and 2 minutes, while the microwave cooking was for 1.5 minutes at a power level of 10 kilowatts. In the waveguide method of cooking, the pre-frying was at 400° F. for 3.5 minutes, and the microwave heating was applied for 16 seconds at 25 KW.

It will be understood that in these examples, the time of microwave cooking in the waveguide was adjusted by changing the speed of movement of the chicken part through the waveguide, through change of its angle of tilt, and the microwave power was applied continuously to the waveguide.

While the invention has been described with particular reference to specific embodiments thereof in the interest of complete definiteness, it will be understood that it may be embodied in a variety of forms diverse from those specifically shown and described, without departing from the spirit and scope of the invention as defined by the appended claims.

What is claimed is:

1. The methd of cooking a battered chicken part, comprising:
   a. subjecting said battered chicken part to a first cooking in hot cooking oil only, without microwave energy, and at a temperature sufficiently high, and at least about 340° F., and for a period of time sufficiently long, and at least about 3 minutes, to dehydrate and brown the batter and to partially cook the interior meat of the chicken part to a temperature of from about 100° to 150° F., but insufficient to cook the interior meat completely; and
   b. thereafter subjecting said chicken part while completely immersed in hot cooking oil to high intensity microwave energy for a period of time of less than about 1.5 minutes at a microwave power level at least 5 kilowatts sufficient to raise the temperature of said interior meat to at least about 160° F. and complete cooking of said interior meat.

2. The method of claim 1, wherein said first cooking is in hot cooking oil maintained at a temperature of from about 340° to about 400° F. for a period of about 3 to 8 minutes.

3. The method of claim 1, wherein said chicken part contains bone, said first cooking is sufficient to bring the temperature of the interior meat adjacent the bone to a temperature of from about 100° to 150° F., and said subjecting to microwave energy is sufficient to raise the temperature of said interior meat adjacent said bone to at least about 160° F.

4. The method of claim 1, wherein said microwave power level is at least about 10 kilowatts, applied for less than 1 minute.

5. The method of claim 1, wherein said first cooking is in oil at a temperature of from about 340° to about 400° F. for a period of about 3 to 8 minutes, and said microwave energy is applied to said chicken part in a waveguide at a power level of from about 10 to about 25 kilowatts for a period of from about 8 to about 30 seconds.

* * * * *